United States Patent
Li et al.

(10) Patent No.: US 11,423,146 B2
(45) Date of Patent: Aug. 23, 2022

(54) PROVENANCE-BASED THREAT DETECTION TOOLS AND STEALTHY MALWARE DETECTION

(71) Applicant: NEC Laboratories America, Inc., Princeton, NJ (US)

(72) Inventors: Ding Li, Franklin Park, NJ (US); Xiao Yu, Princeton, NJ (US); Junghwan Rhee, Princeton, NJ (US); Haifeng Chen, West Windsor, NJ (US); Qi Wang, Urbana, IL (US)

(73) Assignee: NEC Corporation

( * ) Notice: Subject to any disclaimer, the term of this patent is extended or adjusted under 35 U.S.C. 154(b) by 94 days.

(21) Appl. No.: 16/991,288

(22) Filed: Aug. 12, 2020

(65) Prior Publication Data

US 2021/0064751 A1   Mar. 4, 2021

Related U.S. Application Data

(60) Provisional application No. 62/892,036, filed on Aug. 27, 2019.

(51) Int. Cl.
*G06F 21/56* (2013.01)
*G06F 21/55* (2013.01)
(Continued)

(52) U.S. Cl.
CPC ............ *G06F 21/566* (2013.01); *G06F 21/54* (2013.01); *G06F 21/552* (2013.01);
(Continued)

(58) Field of Classification Search
CPC ....... G06F 21/54; G06F 21/552; G06F 21/566
See application file for complete search history.

(56) References Cited

U.S. PATENT DOCUMENTS 11,094,020 B1 *   8/2021  Lee .................. G06F 16/215
2017/0324759 A1 * 11/2017  Puri ................. H04L 63/1425
(Continued)

OTHER PUBLICATIONS

Rui Mei • Han-Bing Yan • Zhi-Hui Han • Jian-Chun Jiang; CTSCOPY: Hunting Cyber Threats within Enterprise via Provenance Graph-based Analysis; 2021 IEEE 21st International Conference on Software Quality, Reliability and Security (QRS) (pp. 28-39); (Year: 2021).*

(Continued)

*Primary Examiner* — Luu T Pham
*Assistant Examiner* — Chao Wang
(74) *Attorney, Agent, or Firm* — Joseph Kolodka

(57) ABSTRACT

Systems and methods for a provenance based threat detection tool that builds a provenance graph including a plurality of paths using a processor device from provenance data obtained from one or more computer systems and/or networks; samples the provenance graph to form a plurality of linear sample paths, and calculates a regularity score for each of the plurality of linear sample paths using a processor device; selects a subset of linear sample paths from the plurality of linear sample paths based on the regularity score, and embeds each of the subset of linear sample paths by converting each of the subset of linear sample paths into a numerical vector using a processor device; detects anomalies in the embedded paths to identify malicious process activities, and terminates a process related to the embedded path having the identified malicious process activities.

11 Claims, 10 Drawing Sheets

(51) Int. Cl.
  *G06K 9/62* (2022.01)
  *G06F 21/54* (2013.01)
(52) U.S. Cl.
  CPC ......... *G06K 9/6257* (2013.01); *G06K 9/6269* (2013.01); *G06K 9/6296* (2013.01)

(56) References Cited

U.S. PATENT DOCUMENTS

| | | | |
|---|---|---|---|
| 2020/0285737 A1* | 9/2020 | Kraus | G06F 21/554 |
| 2021/0004458 A1* | 1/2021 | Edwards | G06F 21/554 |
| 2021/0006471 A1* | 1/2021 | Kvasyuk | H04L 43/062 |

OTHER PUBLICATIONS

Yulai Xie • Dan Feng • Yuchong Hu • Yan Li • Staunton Sample • Darrell Long Long; Pagoda: A Hybrid Approach to Enable Efficient Real-Time Provenance Based Intrusion Detection in Big Data Environments; IEEE Transactions on Dependable and Secure Computing (vol. 17, Issue: 6, pp. 1283-1296); (Year: 2020).*

Bushra A. AlAhmadi • Ivan Martinovic; MalClassifier: Malware family classification using network flow sequence behaviour; 2018 APWG Symposium on Electronic Crime Research (eCrime) (pp. 1-13); (Year: 2018).*

Kruegel et al, "Static Disassembly of Obfuscated Binaries", In USENIX Security Symposium, Aug. 2004, pp. 18-18, vol. 13.

Kirat et al., "Barecloud: Baremetal Analysis-Based Evasive Malware Detection", In 23rd USENIX Security Symposium (USENIX Security 14), Aug. 2014, pp. 287-301.

Kapravelos et al., "Revolver: An Automated Approach to the Detection of Evasive Web-Based Malware", In Presented as part of the 22nd USENIX Security Symposium (USENIX Security 13), Aug. 2013 pp. 637-652.

Caballero et al., "Measuring Pay-Per-Install: The Commoditization of Malware Distribution", In Usenix Security Symposium, Aug. 2011, pp. 13-13.

Li et al., "Finding the Linchpins of the Dark Web: A Study on Topologically Dedicated Hosts on Malicious Web Infrastructures", In 2013 IEEE Symposium on Security and Privacy. IEEE, pp. 112-126, May 2013.

Stokes et al., "Webcop: Locating Neighborhoods of Malware on the Web", Usenix Workshop on Large-Scale Exploits and Emerging Threats (LEET), Apr. 2010, pp. 1-8.

Xu et al., "Autoprobe: Towards Automatic Active Malicious Server Probing Using Dynamic Binary Analysis", In Proceedings of the 2014 ACM SIGSAC Conference on Computer and Communications Security. ACM, Nov. 2014, pp. 179-190.

Kwon et al., "The Dropper Effect: Insights into Malware Distribution with Downloader Graph Analytics", In Proceedings of the 22nd ACM SIGSAC Conference on Computer and Communications Security. ACM, Oct. 2015, pp. 1118-1129.

Rahbarinia et al., "Real-Time Detection of Malware Downloads Via Large-Scale URL-> file-> Machine Graph Mining", In Proceedings of the 11th ACM on Asia Conference on Computer and Communications Security. ACM, May 2016, pp. 783-794.

Stringhini et al., "Marmite: Spreading Malicious File Reputation Through Download Graphs", In Proceedings of the 33rd Annual Computer Security Applications Conference. ACM, Dec. 2017, pp. 91-102.

Cylance, I Kill You! (2019). https://skylightcyber.com/2019/07/18/cylance-i-kill-you/., Jul. 2019.

Milajerdi et al., "HOLMES: real-time APT detection through correlation of suspicious information flows.", In 2019 EEE Explore Symposium on Security and Privacy IEEE, pp. 1137-1152, May 2019.

Hossain et al., "SLEUTH: Real-time attack scenario reconstruction from COTS audit data", In 26th USENIX Security Symposium (USENIX Security 17), pp. 487-504, Vancouver, BC, 2017 USENIX Association, Aug. 2017.

Hassan et al., "NoDoze: Combatting Threat Alert Fatigue with Automated Provenance Triage.", pp. 1-15, NDSS Symposium, Feb. 2019.

Liu et al., "Towards a Timely Causality Analysis for Enterprise Security.", pp. 1-15, NDSS Symposium, Feb. 2018.

Wang et al., "Deep Program Reidentification: A Graph Neural Network Solution.", in SIAM International Conference on Data Mining (SDM'19), University of Illinois at Chicago, pp. 1-35, Dec. 2018.

Anderson et al., "Graph-based malware detection using dynamic analysis", J Comput Virol (2011) 7:247-258, Jun. 2011, pp. 247-258.

Barabosch et al., "Bee Master: Detecting Host-Based Code Injection Attacks", DIMVA 2014, Jul. 2014, pp. 1-20.

Barabosch et al., "Quincy: Detecting Host-Based Code Injection Attacks in Memory Dumps", DIMVA 2017, Jul. 2017, pp. 209-229.

Chen et al., "Entity Embedding-Based Anomaly Detection for Heterogeneous Categorical Events", Proceedings of the Twenty-Fifth International Joint Conference on Artificial Intelligence (IJCAI-16), Jul. 2016, pp. 1396-1403.

Dong et al., "Efficient Discovery of Abnormal Event Sequences in Enterprise Security Systems", CIKM'17, Session 3F: Temporal Data, Nov. 2017, pp. 707-715.

Hardy et al., "DL4MD: A Deep Learning Framework for Intelligent Malware Detection", 2016 Int'l Conf. Data Mining, Dec. 2016, pp. 61-67.

Kolosnjaji et al., "Deep Learning for Classification of Malware System Call Sequences", AI 2016, LNAI 9992, Dec. 2016, pp. 137-149.

Korczynski et al., Capturing Malware Propagations with Code Injections and Code-Reuse Attacks, CCS'17, Session H2: Code Reuse Attacks, Oct. 2017, pp. 1691-1708.

Pek et al., "Membrane: A Posteriori Detection of Malicious Code Loading by Memory Paging Analysis", ESORICS 2016, pp. 199-216.

Shu et al., "Unearthing Stealthy Program Attacks Buried in Extremely Long Execution Paths", CCS'15, Oct. 2015, 13 pages.

Siddiqui et al., "Detecting Cyberattack Entities from Audit Data via Multi-View Anomaly Detection with Feedback", The Workshops of the Thirty-Second AAAI Conference on Artificial Intelligence, Feb. 2018, pp. 227-284.

Caselli et al., "Sequence-aware Intrusion Detection in Industrial Control Systems", CPSS'15, Apr. 2015, pp. 13-24.

* cited by examiner

PROVENANCE-BASED THREAT DETECTION TOOLS AND STEALTHY MALWARE DETECTION

RELATED APPLICATION INFORMATION

This application claims priority to Provisional Application No. 62/892,036, filed on Aug. 27, 2019, incorporated herein by reference in its entirety.

BACKGROUND

Technical Field

The present invention relates to a provenance-based threat detection tool and method, and more particularly a provenance-based threat detection tool and method that identifies fileless attacks in real-time and stops them from completing an attack.

Description of the Related Art

Traditional threat detection tools and techniques such as Antivirus (AV) scanners identify a threat and stop it from acting by looking for specific Indicator(s) of Compromise (IoC). A new genus of malware has emerged recently that breaks the rules of traditional threat detection software such as anti-virus. Unlike other types of malware that require the installation of software on a victim's machine, fileless malware infects a victim host's random access memory (RAM). Fileless malwares has been defined by some as "malware that does not store its body directly onto a disk." It is very challenging to detect fileless malware using conventional threat detection tools that rely on file signatures because fileless attacks can evade the traditional detection tool by using the victim host's dynamic memory and otherwise legitimate tools to compromise host. This "stealthy malware" uses various techniques to impersonate or use applications and legitimate system tools that can minimize its footprint in a targeted system and be on anti-virus "white lists." "Living off the land" has been a popular trend in cyberattacks over the last few years. It is characterized by the usage of trusted off-the-shelf applications and pre-installed system tools to conduct such stealthy attacks. Since many of these tools are used by system administrators for legitimate purposes, it is harder for the defenders to completely block access to these tools for attack prevention. Stealthy malware can hide the malware's (or an attacker's) identity by impersonating these well-trusted benign processes. Even security approaches that do not use file signatures for detection can have a hard time discovering elusive fileless attacks. To detect "stealthy" or fileless malware, enterprises need a new approach that doesn't rely on malware signatures, analyzing files written to disk, and learning from what past malware looks like and how it behaves.

Although named "fileless", such malware might not be 100% file-free. They may still rely on files in some stages of a whole attack campaign. Fileless attacks can be completely fileless, such that the attack never involves writing a file on a disk of a computer system, indirectly uses files on a disk, or have some sort of fileless persistence but not without using files to operate. A key feature of "file-less" malware is that it does not expose its malicious code directly in a stored file or executable. That is fileless malware does not expose malicious features on hard disks. These attacks usually do not touch the disk, and do not trigger antivirus file scanning.

There are multiple ways to execute file-less malware. One way is to take advantages of the vulnerability of benign software. For example, CVE-2019-0541 allows adversaries to execute arbitrary code in Internet Explorer® (IE) through a specially crafted web page. A second example is taking advantages of the script interpreters, such as PowerShell or Windows Management Instrumentation (WMI). A third example is to use a "not malicious" malware that injects malicious code to a benign process's memory. For example, Reflective DLL Loading is a method to accomplish memory injection.

In various instances, the initial penetration vector can be spear-phishing attacks using social engineering directed towards top-level management, including CIOs. Attackers can embed scripts in benign documents like text documents, such as a resume, customer complaint, etc., to run their malicious payload. Worse, the operating system can open access to its core functionalities via various language interfaces (e.g., PowerShell and .Net) that an attacker could take advantage of. Such dynamic languages facilitate execution of malicious logic on-the-fly, leaving little or no footprints on the filesystem. Downloaded PowerShell scripts can be obfuscated and resided only in memory. The attacks can be DLL sideloading attack in various application software. The attack can also be an advanced persistent threat (APT). Lockdown approaches, such as application control, may not help much because fileless malware leverages administrative tools and other applications that are typically in a company's whitelist of known "good" or "benign" applications.

Data provenance can provide the contextual information about applications and data. A provenance-aware system automatically gathers and reports metadata that describes the history of each object being processed on the system. Data provenance can describe the actions taken on a data object from its creation to the present time, which can allow users to understand how data objects came to exist in their present state.

SUMMARY

According to an aspect of the present invention, a computer implemented provenance-based threat detection method is provided for detecting stealthy malware. The method includes building a provenance graph including a plurality of paths using a processor device from provenance data obtained from one or more computer systems and/or networks. The method further includes sampling the provenance graph to form a plurality of linear sample paths, and calculating a regularity score for each of the plurality of linear sample paths using a processor device. The method further includes selecting a subset of linear sample paths from the plurality of linear sample paths based on the regularity score, and embedding each of the subset of linear sample paths by converting each of the subset of linear sample paths into a numerical vector using a processor device. The method further includes detecting anomalies in the embedded paths to identify malicious process activities, and terminating a process related to the embedded path having the identified malicious process activities.

According to another aspect of the present invention, a system is provided for provenance-based threat detection. The system includes a computer system including random access memory configured to store a provenance-based threat detection tool, and one or more processor devices and an operating system having a kernel, wherein one or more hook functions operating in the kernel are configured to collect provenance data. The system further including a database configured to store the provenance data collected by the one or more hook functions, wherein the provenance-based threat detection tool is configured to build a provenance graph including a plurality of paths using the one or more processor devices from provenance data obtained from the computer systems and/or a network; sample the provenance graph to form a plurality of linear sample paths; calculate a regularity score for each of the plurality of linear sample paths using the one or more processor devices; select a subset of linear sample paths from the plurality of linear sample paths based on the regularity score; embed each of the subset of linear sample paths by converting each of the subset of linear sample paths into a numerical vector using the one or more processor devices; detect anomalies in the embedded paths to identify malicious process activities; and terminate a process related to the embedded path having the identified malicious process activities.

According to another aspect of the present invention, a non-transitory computer readable storage medium comprising a computer readable program for a computer implemented provenance-based threat detection tool, wherein the computer readable program when executed on a computer causes the computer to perform the computer implemented provenance-based threat detection method.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
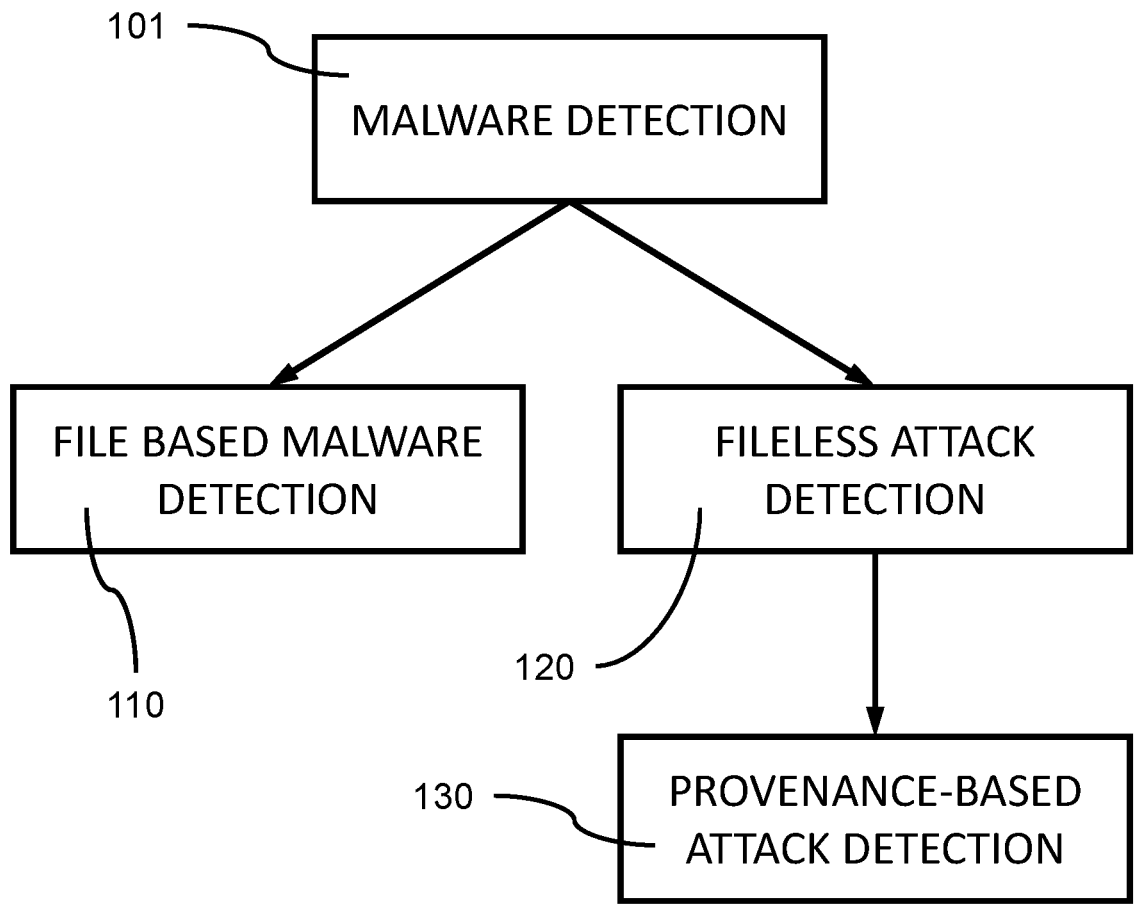
FIG. 1 is a block/flow diagram illustrating the hierarchical arrangement of the types of malware threats and detection approaches showing the relationship of fileless malware and provenance-based detection to other threats and detection methods, in accordance with an embodiment of the present invention.

In accordance with embodiments of the present invention, systems and methods are provided for a provenance-based threat detection tool that identifies fileless attacks in real-time and responds in a manner that stops them from continuing and/or spreading. An aspect of the provenance-based threat detection method or system (i.e., tool) is to first build an understanding of a finite set of legitimate/normal system behaviors that happens in an enterprise network. Then use machine learning models to detect behavior that deviates from normal behavior and flag it as a fileless attack. The approach is evaluated on a large dataset from an enterprise network, and demonstrates that it achieves very high accuracy. Interpretability studies also were conducted to understand the internals of the learned machine learning models.

Embodiments of the present method and system utilize a new approach that doesn't rely on malware signatures, analyzing files written to disk, and learning from what past malware looks like, but how it behaves.

Embodiments of the present invention relate to a positive security model that focuses on understanding a finite set of legitimate system behavior. When the behavior isn't following a recognized normal path, the provenance-based model assumes it is "bad" and prevents it from executing, no matter what attack vector or method is being used. This is a more foolproof approach to fileless malware detection, since there is a finite set of "good" or normal operating system behavior versus an infinite number of attack methods or "bad" system behavior.

Machine learning and artificial intelligence powered products often focus on the malware pre-execution step and, thus, looks at files written to disk, for example, by malware scanning. These types of tools are trained on known malware samples and have trouble recognizing an indicator of compromise (IoC) if they haven't seen something like it before. Detecting known malware approaches fall short because they can't keep up with hackers who are capable of creating a practically infinite number of new malware types and variants, and who are increasingly hiding them in memory.

"Stealthy" malware normally does not expose its malicious payload in a file and hides its malicious behaviors among the benign behaviors of infiltrated processes. Unlike traditional malware families that persist on a disk for its payload, stealthy malware hides its malicious code/logic in the memory space of well-trusted processes, or stores it into less attended locations, such as Windows registry or service configurations. Stealthy malware can minimize the usage of regular file systems, and instead use locations of a network buffer, registry, and service configurations to evade traditional file-based malware scanners. The attack can take advantage of well-trusted and powerful system utilities. For instance, PowerShell and Windows Management Instrumental Command-line (WMIC) have long histories of being abused by attackers. An attack can inject malicious logic into benign processes via legitimate OS APIs (e.g., CreateRemoteThread( ) of Win32 API) or use shared system resources. Memory code injection allows malware to inject malicious code into a legitimate process' memory area. These attacks often target long-running, trusted system processes (e.g., svchost.exe) or applications with valuable user information (e.g., Web Browser). Some well-known code injection techniques include remote thread injection, reflective DLL injection, portable executable injection, and recently discovered process hollowing and shim-based DLL injection. These attacks are more likely to succeed compared to traditional attacks, because the detection approaches that are based on static or behavioral signatures cannot keep up with the evolution of this stealthy malware. Stealthy attacks could conduct extremely damaging activities such as exfiltrating sensitive data, crippling computers, or allowing remote access. Exploiting legitimate tools or applications enable those attacks to do their malicious activities while blending in with normal system behavior and leaving fewer footprints, which makes their detection very difficult.

Provenance-aware system can utilize metadata that describes the history of each object being processed on the system to identify changes from routine and legitimate/normal system behaviors, which can be of value to computer security by identifying malicious activity rather than known malware snippets or signatures.

A key challenge is to accurately capture the semantic behavior and features of benign and malicious program instances from the enormous provenance data. Gigabytes of provenance data can be generated on a daily basis by various enterprises. Provenance data can also vary dynamically. The provenance data of two different instances of the same program on the same host are often different. Simply memorizing the provenance data of fileless malwares may yield high false positive and false negative rates. To accurately detect fileless malware, a provenance-based malware detector can identify the core semantic features of each program and model their behavior. This can be used as a baseline for comparison to the behavior of processes being executed on a system, as well as the process behavior of the system's operating system itself. Programs can have patterns in their dependency graph. Less frequent patterns can indicate a malicious process.

Embodiments of the present invention provide an effective defense that meets the following three principles. First, the defense technique should not be based on static file-level indicators since they are not distinguishable for stealthy malware. Second, the technique should be able to detect abnormal behavior of well-trusted programs as they are susceptible to attackers with stealthy attack vectors. Third, the technique should be light-weight so as to capture each target program's behavior at a detailed level from each host without deteriorating usability.

A provenance-based threat detection tool also can be unaffected by malware encryption and shell techniques, since the threat detection tool does not rely on static code features, such as signatures or program hashes. The provenance-based threat detection tool detects abnormal program instances; thus, it is able to detect zero-day (also referred to as "0-day") malwares and attacks. Since zero-day attacks are generally unknown to the software vendor and the public, it is often difficult to defend against them because there are no known signatures to identify the malware or attack profile.

A provenance-based threat detection tool may detect behavior that deviates from normal behavior and flag it as a fileless attack. Knowledge from data provenance analysis can be utilized to understand a benign system event and recognize it from a malicious event, which may look very similar when viewed in isolation. Thus, even if the malware authors have changed the signatures or IDs of fileless malware entities, the provenance-based threat detection tool is still capable of detecting them by recognizing deviations from benign behavior of processes.

A program often loads a fixed set of libraries and files to provide designed functionalities. The program or process can also have patterns in network accessing and inter-process communication. These program and process patterns can be used to detect fileless malware and attacks even when they use signatures and IDs of benign programs.

In an example, a fake version of a known and often used software application having the same name as the true software application can be loaded onto a computer system. The ID and signatures of the malware can be changed to mimic a version of the true and authentic software application. The true version of the software application can have unique features in the provenance data. The true version of the software application may be known to load a certain set of .DLL libraries and .DAT files. In contrast, the malware version of the application would not have the same pattern as the true version of the software application. The malware version may instead directly access an external network address to download malicious code, rather than following the expected series of program actions, which differentiates itself from the true version of the software application.

An OS kernel can support data collection for provenance analysis incurring only a reasonable amount of overhead. Kernel-level provenance monitoring can capture the dynamic behaviors of each of a plurality of target process, and a provenance-based threat detection tool can detect a program's runtime behaviors that deviate from previously observed benign execution history. Provenance metadata can also be associated with internet protocol (IP) packets in order to better understand network events in distributed computer systems and networks.

It is challenging to capture the semantic level behaviors from dependency graphs because the dependency graph of different instances of the same program may vary time to time. For example, a software application many load some temporary files in each instance. These temporary files are often generated randomly with random IDs and are different in different instances of the software application. How to accurately capture the core and stable features of each program, therefore can be technically difficult.

Attackers may also attempt to mimic the patterns in generated in provenance data or of a benign program. In these cases, the attacker may bypass the detection of a provenance-based detector. However, by forcing the attacker to mimic the behaviors of a benign program or instrument, the bar for avoiding detection has been increased. It can be substantially harder for an attacker to mimic the behavior of a benign program rather than simply hide the malicious features of the malware, at least because it is very difficult for an attacker to know what activities should be carried out to evade detection by provenance analysis. A provenance graph of a true attack can include dependencies with benign events which might not be causally related to the attack.

Both the embedding model and the detection model can be trained with only benign data.

In one or more embodiments, the provenance-based threat detection tool can monitor three types of entities: processes, files, and network communications.

In one or more embodiments, a graph-learning based technique can be used to accurately capture the semantic behavior of all the legitimate programs in the enterprise. Embodiments can build an understanding of a finite set of legitimate/normal system behaviors for a graph of the processes in an enterprise network. Data provenance analysis can collect semantic behavior of an executed application or process, where the data provenance can provide contextual information about the application(s).

Impersonation-based stealthy malware can incur only marginal deviation for its malicious behavior, so it can blend into a benign program's normal behavior. For example, some stealthy malware only creates another thread to plant its malicious logic into the victim process. While the victim process still carries out its original tasks, the injected malicious logic also runs alongside it. Therefore, the provenance-based threat detection tool would accurately identify and isolate the marginal outlier events that deviate significantly from the program's benign behaviors. Conventional model learning is likely to disregard such a small portion of behavior as negligible background noise, resulting in misclassification of malicious behaviors, whereas the presently described approach can generate multiple sample paths that isolate different sequences of events to identify the malicious activities.

To address the first challenge, the provenance-based threat detection tool can be configured to break provenance graphs into sample or causal paths, as features for detection, and uses the causal paths as the basic components for detection. The insight of this decision is that the actions of stealthy malware have logical connections and causal dependencies. By using causal paths as detection components, the provenance-based threat detection tool can isolate the benign part of the provenance graph from the malicious part.

In various embodiments, a provenance graph of program instances, for example, function calls, data writes to memory, data reads, etc., can be generated from provenance data, where causal paths can be used as the features for a provenance graph. The lengths of causal paths, however, are not fixed. The causal paths can be viewed as a sentence with each node of the path or graph considered a noun, and each edge of the path or graph considered a verb. For example, an initial application program can be a first node/noun, and the first action by the application program, for example "write", can be an edge/verb that generates another node/noun, for example "A.doc". A.doc can be read by another application that sends the doc over the internet to a website, which produces additional edges and nodes for the path.

FIG. 1 is a block/flow diagram illustrating the hierarchical arrangement of the types of malware threats and detection approaches showing the relationship of fileless malware and provenance-based detection to other threats and detection methods, in accordance with an embodiment of the present invention.

Entities, including individuals, businesses, and governments, utilize malware detection 101 to protect their computer systems and networks from malicious actors that use malicious software (i.e., malware) to compromise the integrity of those computer systems and networks. Malware detection can identify malware that has infected the computer systems and/or networks; although, certain type of malware detection, for example, anti-virus scanners, that are directed to file based malware 110 may only identify that particular type of malware. Conversely, other malware detection may utilize different approaches directed towards fileless attack detection 120 that does not rely on things like signature identification used for file-based malware detection 110. A particular approach to fileless attack detection can be provenance-based attack detection 130.

In various embodiments, a provenance-based threat detection tool can achieve a very high detection performance with an average F1 score of 0.974. A provenance-based threat detection tool can also be efficient enough to be used in a realistic enterprise environment.

Figure 2:
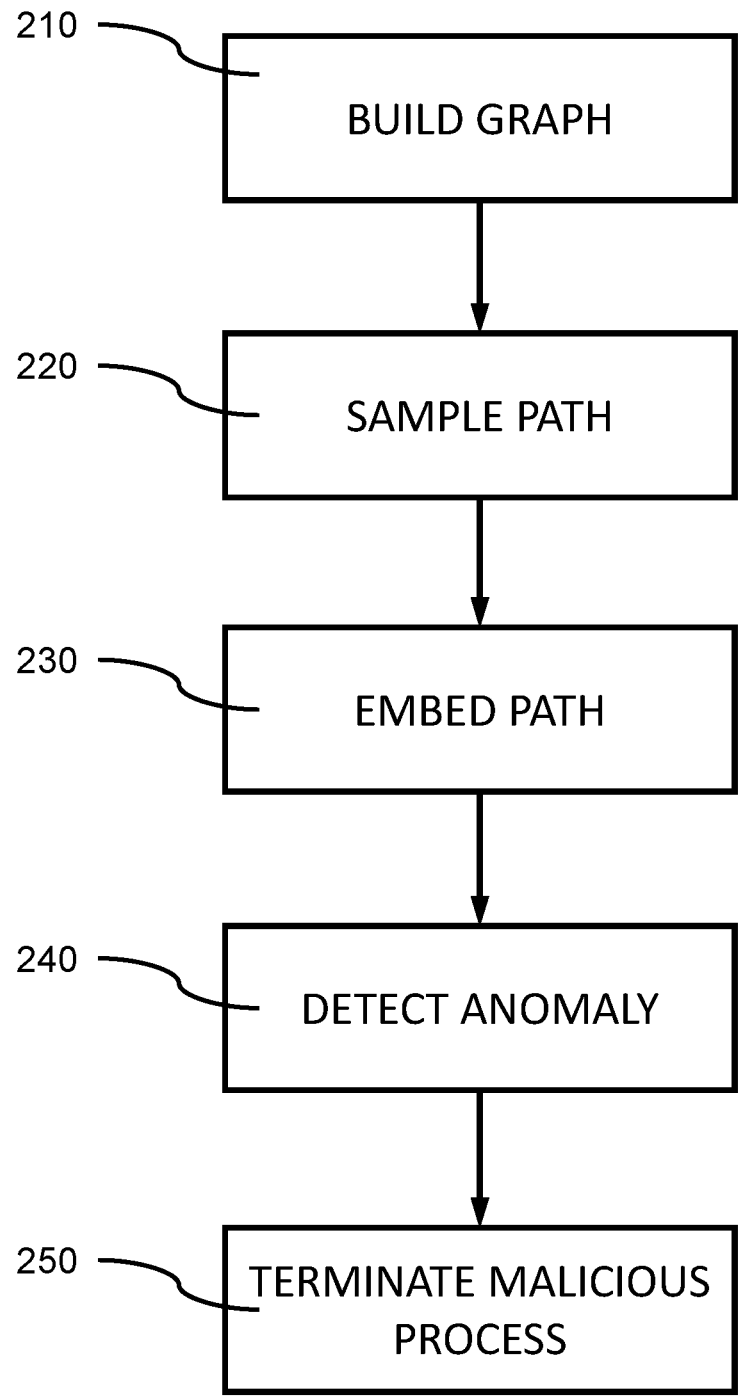
FIG. 2 is a block/flow diagram illustrating a high-level system/method of an algorithm for provenance detection of stealthy malware threats, in accordance with an embodiment of the present invention.

FIG. 2 is a block/flow diagram illustrating a high-level system/method of an algorithm for provenance detection of stealthy malware threats, in accordance with an embodiment of the present invention.

In various embodiments, stealthy malware can be detected by inspecting its behavior through tracking and analyzing provenance data related to a program.

In block 210, a provenance-based threat detection tool or method can build a provenance graph from provenance data obtained from one or more computer systems and/or networks, where the provenance data can be collected by one or more processor devices (e.g., central processing units (CPUs), graphic processing units (GPUs), signal processing units (SPU), etc.). The provenance data can be collected using hook functions by a monitoring agent and/or an operating system (OS) kernel. The provenance-based threat detection tool can be configured to monitor a set of M programs (e.g., Microsoft Word or Internet Explorer®) and detect if they are hijacked by stealthy malware. In various embodiments, a monitoring agent on each monitored host system collects system provenance data and can store the data in a centralized database. In various embodiments, the database can utilize a general graph database built on a SNAP library or PostgreSQL. The provenance-based threat detection tool can scan the database and checks if any of the newly added processes has been hijacked.

Provenance collection mechanisms have been implemented at a variety of different layers, including, network monitors, Application layer monitors, platforms, operating systems, and kernels. The provenance-based threat detection tool can monitor operating system (OS) level provenance events. Provenance data may be captured, for example, through Linux® Security Module (LSM) hooks, Linux® Provenance Module (LPM) hooks, and NetFilter hooks. The Linux® Security Module (LSM) framework includes security fields in kernel data structures and calls to hook functions at critical points in the kernel code to manage the security fields and to perform access control. It also adds functions for registering security modules. Hooking involves intercepting function calls or messages or events passed between software components. Code that handles such intercepted function calls, events or messages is referred to as a hook. Hook functions can intercept operating system calls or function calls in order to monitor behavior or modify the function of an application or other component.

In various embodiments, three types of system entities: processes, files and network connections (e.g., sockets) are considered. A system event e=(src, dst, rel, time) models the interaction between two system entities, where src is the source entity, dst is the destination entity, rel is the relation between them (e.g., a process writes a file, opens a network connection, etc.), and time is the timestamp when the event happened. Note that, in various embodiments, the process entity is the source entity in a system event. Each system entity can be associated with a set of attributes. For example, a process entity has attributes like its process ID (PID) and an executable path.

In various embodiments, given a process instance, p, (as identified by a process ID (PID) and host) in a system, the system provenance graph of p is the graph that contains all system entities that have control/data dependencies to p. Formally, the provenance graph of p is defined as G(p)=<V, E>, where V and E are the sets of vertexes and edges respectively. v∈V if v==p or ∃e∈E where e.src∈V or e.dst∈V. Vertexes, v, are system entities and edges, e, are system events.

In various embodiments, for each event in the event database, backtracking and forward tracking can be executed, where the depth of tracking can be N nodes backwards and N nodes forward along the graph from the chosen (i.e., starting) node, where the starting node can be a specified entity or event. N is the number of steps that a tracking algorithm goes backwards or forwards from a specified event. The value of N can be predetermined, for example, by the program or algorithm, or selected by a user, to control the extent of the analysis and amount of computational resources used. A false alert may look very similar to true alert if only a single entity or event is examined.

When N=1, the tracking algorithm looks at only those events that are directly related to the specified events; when N=2, it looks at additional events that are related to all events identified from N=1; and when N=3 it further looks at events related to those identified from N=2, and etc. In this respect, the tracking algorithm can be similar to an n-gram process with branches.

In various embodiments, a program (or an application) to be monitored is referred to as a program, for example, some trusted applications like a word processor or email client (e.g., MS Word or Outlook®). A process is an execution of a program. A process instance, p, of a program is the process created in one execution of the program.

In various embodiments, because hook functions can continually monitor a process, the collected provenance data and related provenance graph can grow dynamically in real time as one or more processes run. This continuous growth can lead to very large provenance graphs, that can cause difficulties in anomaly detection. It can be impractical or even impossible to wait for a "whole" graph because the graph may grow indefinitely, and malicious activities and actions may be implemented and completed while anomaly detection waits for a provenance graph to be "completed." Analysis of a subset of paths to identify benign and malicious paths can, therefore, be done while provenance data is collected and the provenance graph grows. Without identifying a subset of causal paths, a threat detection tool would only be looking at a rapidly changing and expanding provenance graph. Such an approach can generate excessive false positive and false negative results, and such results would not necessarily be generated in a timely manner due to the size of the graph being analyzed. Trying to find or determine a malicious activity from a single snapshot of a single entity or event could also generate excessive false positive and false negative results.

In various embodiments, given a process instance p of application A and its system provenance graph G(p), it is an aim to detect if G(p) contains any anomalous paths that are different from paths in system provenance graphs of benign process instances of the same application A.

In various embodiments, if there is a set of n provenance graphs s={$G_1, G_2, \ldots, G_n$} for n benign process instances, $p_n$, of a program A, and given a new process instance p of A, it is the aim to detect if the provenance graph G(p) of the new process instance p is benign or malicious. A malicious process instance of program A can be referred to as a process that is hijacked or abused by stealthy malware. The provenance graph G(p) of the malicious process is thus referred to as a malicious provenance graph, G'(p).

The size of the provenance graph grows rapidly over time connecting an enormous number of system objects. For a provenance-based approach, which takes provenance data as its input and builds a model for each process, it is common to see that even in a small organization that has over hundreds of hosts, the system events reported from each end-host incur significant data processing pressure. While simplistic modeling that is based on a single-hop relation scale can be used to digest large-scale provenance graphs, the single hop relation cannot capture and embed contextual causality into the model. However, modeling that is based on a multi hop relation (e.g., n-gram or sub-graph matching) could incur huge computation and storage pressure, making it infeasible for any realistic deployment. In various embodiments, n-gram or sub-graph matching is not used for modeling.

In block 220, the provenance-based threat detection tool or method can sample the paths that were built using the provenance data to identify benign and malicious paths.

In various embodiments, a sequence of nodes and edges form a provenance graph, and sample paths are a sequence of nodes and edges selected from the current "whole" provenance graph, where a sample path does not include branches in the graph. The path follows a single sequence of nodes without including multiple edges from the same node forming branch points, so each node connects to one other node along one edge. In contrast, the provenance graph can include a node connected to two or more other nodes with each of the two or more other nodes connected by a single edge. In this manner, one or more of the nodes forming the provenance graph can connect to multiple nodes, and show varying execution or process paths.

Trying to directly extract all paths from a provenance graph may cause a "dependency explosion problem". The number of paths can become exponential to the number of nodes. Since a provenance graph G(p) may contain thousands of nodes generated by multiple concurrent processes, it can become impossible to traverse all its paths in a reasonable time. In addition, the provenance data continues to be collected from running processes and the provenance graph, G continues to grow. To address this problem, a rareness-based path selection method that only selects the K most uncommon paths from a current snapshot of the provenance graph may be used. K can be a user set parameter, that is an integer.

In various embodiments, to address such difficulties with the size of a provenance graph and its dynamic growth, a provenance-based threat detection tool may only analyze the suspicious part(s) of a provenance graph. Path sampling can be used to identify and select sub-paths including a subset of the nodes and edges making up a provenance graph for a process. This filtering can allow the provenance-based threat detection tool to detect anomalies in a process before a malicious activity can be completed. The size and complexity and of a provenance graph can be reduced to one or more shorter paths that can be analyzed in real time.

In various embodiments, suspicious portions of a provenance graph can be identified by recognizing nodes and/or edges that happen less frequently compared to benign nodes and edges learned during training of the provenance-based threat detection tool. Using historical data for the different processes, the frequency of occurrences of node(s) and/or edge(s) can be determined, and one or more subgraphs containing such low frequency node(s) and/or edge(s) can be identified, followed, and analyzed, where such sub-paths can be followed and analyzed in real time.

The provenance-based threat detection tool can use causal paths as features to distinguish the malicious part of the provenance data from the benign part. A false alert may look very similar to true alert if only a single event is examined.

Rare paths are more likely to be malicious. A regularity score, R, can be used to define the rareness of a path. For a path, $\lambda=\{e_1, e_2, e_3, \ldots e_n\}$ where $e=\{\text{src}\rightarrow\text{dst}\}$, where src is source, and dst is destination. The regularity score is given by: $R(\lambda)=\Pi_{i=1\rightarrow n}R(e_i)$. $R(e)=\text{OUT}(\text{src}) |H(e)|/|H|\cdot \text{IN}(\text{dist})$. The less frequent and less stable an event is, the lower a regularity score it has. In various embodiments, finding paths with the lowest regularity scores determines a causal path.

In various embodiments, a regularity score method can be used to sample paths from the provenance graph, G(p), and ranks each path based on their frequency. This is achieved by a path selection algorithm that selects the top K most uncommon causal paths in a provenance graph. The part of a provenance graph that is shared by most instances of a program is not likely to be malicious. Thus, the part that is uncommon in other instances is focused on. The provenance-based threat detection tool can select a subset of causal paths from a provenance graph to address the dependency explosion problem. Leveraging this path selection algorithm, a provenance-based threat detection tool can reduce most of the training and detection workload and accelerate the speed of both training and detection.

In block 230, the provenance-based threat detection tool can embed the path by converting the paths into numerical vectors.

In various embodiments, selected linear graph(s) can be converted to vectors using a document embedding model. The K rarest causal paths can be selected from the subset of causal paths for embedding.

In path embedding, a neural network model can be used to convert a path to a vector, particularly, for an object in the path, the path embedding and the embeddings of surrounding object can be used. An unsupervised learning method can automatically embed the dependency graph into vectors, for example, using graph2vec and doc2vec.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN can be configured for a specific application, such as pattern recognition or data classification, through such a learning process. Layers can include convolutional layers, pooling layers, fully connected layers, softmax layers, or any other appropriate type of neural network layer. Furthermore, layers can be added or removed as needed and the weights can be omitted for more complicated forms of interconnection.

Data provenance can provide the contextual information through reconstructing the chain of events that lead to an alert event (backward tracing) and the ramifications of the alert event (forward tracing). The chain of events can lead to a malicious result.

In one or more embodiments, each path is translated into a sentence, for example, using Doc2Vec. A neural network model can be used to convert the path to a vector. In various embodiments, for an object in the path, path embedding and the embeddings of surrounding objects can be used to form the vector. In various embodiments, a loss function can be utilized to determine the classification error i.e., a malicious node or edge being classified as benign one, and vice versa.

To hunt for stealthy malware, the provenance-based threat detection method or system (i.e., tool) can employ a neural embedding model that can project the different components (e.g., causal paths) from the provenance graph of a process into a n-dimensional numerical vectors space, where similar components (e.g., causal paths) are geographically closer. Then a density-based detection method can be deployed to detect the abnormal causal paths in the provenance graph, where a causal path is an ordered sequences of system events (or edges) $\{e_1, e_2, \ldots, e_n\}$ in G(p) with causal dependency that identifies the steps leading to an identified or recognized outcome. Where $\forall e_i$, $e_{i+1}$, $\subset \lambda$, $e_i.\text{dst}=e_{i+1}.\text{src}$ and $e_i.\text{time}<e_{i+1}.\text{time}$. The time constraint can be important because an event can be dependent on events in the future. Due to the time constraints, the provenance-based threat detection tool will not generate infinite number of paths in loops. For each selected path, the provenance-based threat detection tool removes the host-specific or entity-specific features, such as host name and process identification (PID), from each node and edge. This process ensures that the extracted representation is general for the subsequent learning tasks.

In block 240, the provenance-based threat detection tool can detect anomalies in the paths to identify malicious process activities/steps.

In various embodiments, an outlier detection method can be used to detect if the embedding of a path is abnormal. In various embodiments, an anomaly detection method/model of the neural network can be trained to recognize benign nodes and/or edges, and malicious nodes and/or edges can be identified as outliers in terms of frequency of occurrence. Anything not within the trained frequency distribution can be considered as malicious by the model. The anomaly detection method/model may not use malicious data during model training.

In various embodiments, a classification method/model of the neural network can be trained to identify benign versus malicious nodes and/or edges. In a classification method/model, both benign and malicious data samples can be used to train the neural network. The accuracy of the classification method/model can be determined using a loss function to determine a classification error. The classification error can be minimized through training.

In one or more embodiments, one-class (OC) support vector machine (SVM) (OC-SVM) with radial basis function (RBF) kernel can be used as the detector. In various embodiments, the radial basis function kernel, or RBF kernel, is a kernel function that can be used in various kernelized learning algorithms. In particular, it can be used in support vector machine (SVM) classification. One-class SVM (OC-SVM) is an unsupervised algorithm that learns a decision function for detection, classifying new data as similar or different to the training set. The provenance-based threat detection tool can use an outlier detector to get predictions for the embedding vectors and reports its final decision (i.e., if the process has been hijacked). Anomaly scores alone may not be informative enough to differentiate benign ones and malicious ones.

The benign workloads of a hijacked process may hide the malicious workload in the graph level. It is thus necessary to use the path-level features. With randomly selected paths from the provenance graphs of processes that were hijacked by stealthy attacks, on average, about 70% of randomly selected paths from hijacked processes cannot be detected as malicious by the anomaly detector for a graph-level embedding method.

In various embodiments, a provenance-based threat detection tool can have two modes: the training mode and the detection mode. In various embodiments, provenance graphs can be obtained from benign software. These paths can be inputted into the OC-SVM to train an anomaly detector on benign data. The provenance graphs from benign software, sample paths of them, these paths can be fed to the OC-SVM to train the anomaly detector.

In one or more embodiments, the provenance-based threat detection tool can use Local Outlier Factor (LOF) as the outlier detection model, where LOF is a density based method. A point can be considered as an outlier if it has lower local density than its neighbors. LOF does not make any assumption on the probability distribution of data nor separates the data with a single curve. Thus, it is an appropriate method for an outlier detection problem.

In various embodiments, the outlier or anomaly detector can be based on the nature of the provenance data. Provenance data can have two important features. First, the provenance data cannot be modeled by a single probability distribution model. Modern computer systems and programs are complex and dynamic, it is very hard to model the behaviors of programs with a mathematical distribution model. Second, provenance data can have multiple clusters. Workloads of a program can be very different. Although provenance data from similar workloads may look similar, they will be very different if they are from two distinct workloads. Thus, it is very hard to use a single curve to separate normal and abnormal provenance data in the embedding space. The anomaly detection method/model may use benign data during model training.

In the detection phase, the built outlier detection model can be used to make predictions of path embedding vectors of a provenance graph. A threshold-based method can be used to make a final determination about whether the provenance graph is benign or malicious, where if more than t embedding vectors are predicted as malicious the provenance graph can be treated as malicious. This method could enable an early stop in the path selection process to reduce detection overhead when the top t instead of K selected paths are already predicted as malicious, where t can be less than K.

In various embodiments, there are two machine learning models involved to carry out the detection. Block 230 can use an embedding model to convert the causal paths to numerical vectors; and block 240 feeds the numerical vectors into an LOF model, which produces the detection result (malicious or benign).

In various embodiments, a provenance-based threat detection tool can use a deep learning model to capture the semantic level information of trusted and common programs in the enterprise's network. This deep learning model is only trained from the benign programs, so that it is an anomaly detector (with negative sampling). It detects abnormal program instances that do not belong to the trusted and common programs of an enterprise. These abnormal program instances may often be caused by fileless malware.

In the detection phase, the built outlier detection model can be used to make predictions of path embedding vectors of a provenance graph. A threshold-based method, i.e., if more than t embedding vectors are predicted as malicious we treat the provenance graph as malicious, can be used to make the final decision about whether the provenance graph is benign or malicious. This method could enable an early stop in the path selection process to reduce detection overhead when the top t instead of top K selected paths are already predicted as malicious.

In block 250, the process related to a causal path or provenance graph containing one or more detected malicious activities or actions can be terminated to protect the computer system from infection. In various embodiments, the process can be terminated before the malicious actions culminate in the computer system being compromised by the stealthy malware, where this can include reporting the anomaly to a system administrator (sys admin), terminating the affected processes, and/or isolating (i.e., disconnecting) an affected host from an enterprise network. The OS kernel can be instructed to stop the process, including any related threads.

The detection accuracy of the provenance-based threat detection tool can be consistently high across different programs, having precision ranges from 0.952 to 0.965, recall ranges from 0.965 to 1, and F1-score ranges from 0.961 to 0.982.

Figure 3:
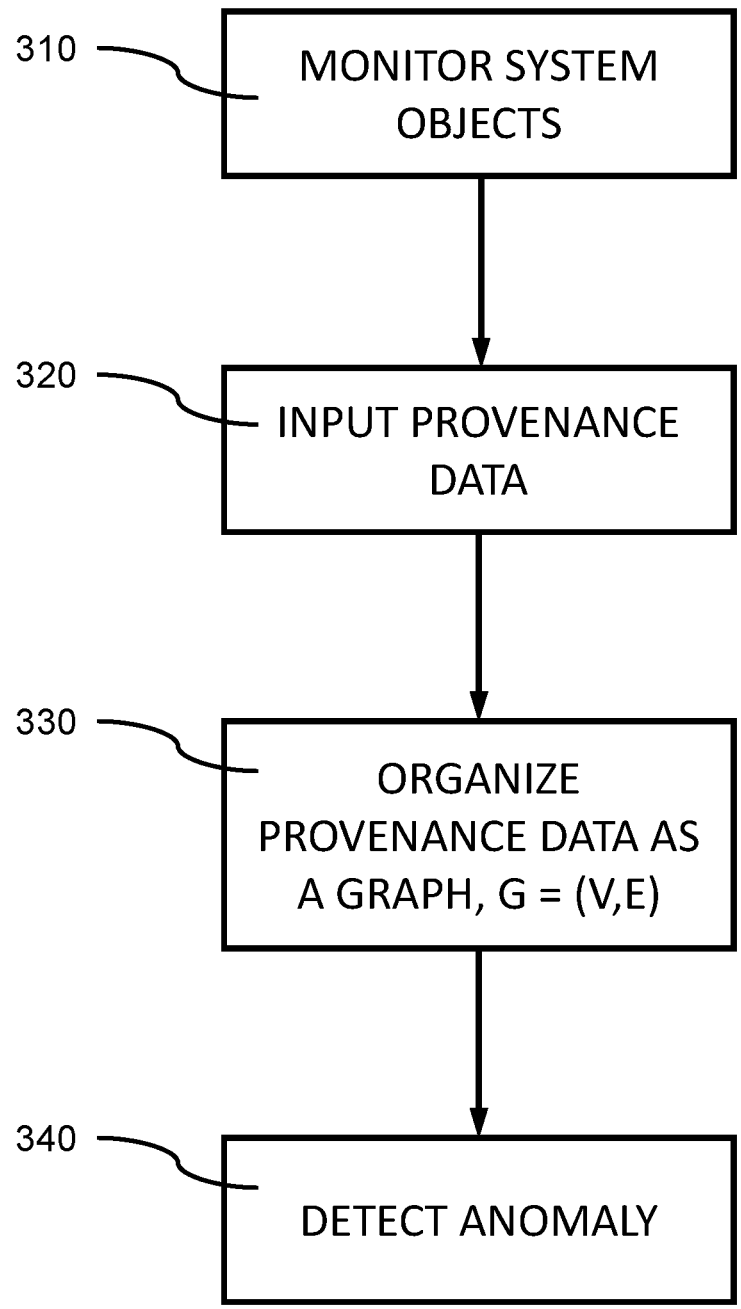
FIG. 3 is a block/flow diagram illustrating a system/method of an algorithm for building a graph of processes for provenance detection, in accordance with an embodiment of the present invention.

FIG. 3 is a block/flow diagram illustrating a system/method of an algorithm for building a graph of processes for provenance detection, in accordance with an embodiment of the present invention.

In one or more embodiments, the provenance-based threat detection tool can build a provenance graph $G(p)=<V,E>$ as a labeled temporal graph using the data stored in a provenance data database. The nodes V are system entities whose labels are their attributes, and E are edges whose labels are relations and timestamps. Each node in V belongs to one of the following three types: processes, files or sockets. We define each edge e in E as e={src; dst; rel; time}. The construction of a provenance graph $G(p)$ starts from comparing v to p, v==p. Then any edge e and its source node src and destination node dst is added to the graph if e.src∈V or e.dst∈V.

In block 310, three types of system objects, including processes, files, and internet protocol (IP) channel, and three types of events, including process-to-file, process-to-IP, and process-to-process, are monitored on a computer system. The object data and event data can be organized as (src, dst), where src and dst are IDs of the object. For a process, its ID can be its executable name, for a file, its ID can be the file path and/or file name, and for an IP channel, its ID can be the IP address. Provenance data collected from different hosts may contain host-specific or entity-specific information such as file paths. To remove such information, abstraction rules can be applied to remove user specific details. A socket connection can have two parts: the source part (IP and port) and the destination part (IP and port). As the IP of a host is a specific field only to the host, a socket connection can be abstracted by removing the internal address while keeping the external address. More specifically, the source part of an outgoing connection and the destination part of an incoming connection can be removed. The provenance data obtained from monitoring the objects and events can be stored in a computer database for later retrieval and analysis.

In block 320, provenance data is input to the provenance-based threat detection tool to build a provenance graph $G(p)$. The provenance data can be retrieved from the database in memory used to store the provenance data.

In block 330, the provenance data is organized as a set of nodes and edges. The nodes and edges can be used to produce the provenance graph $G(p)$ based on the entities, events, and time stamps.

In block 340, anomalies are analyzed and detected.

Benign paths are well clustered, while many malicious paths are identified as outliers of the benign cluster.

Figure 4:
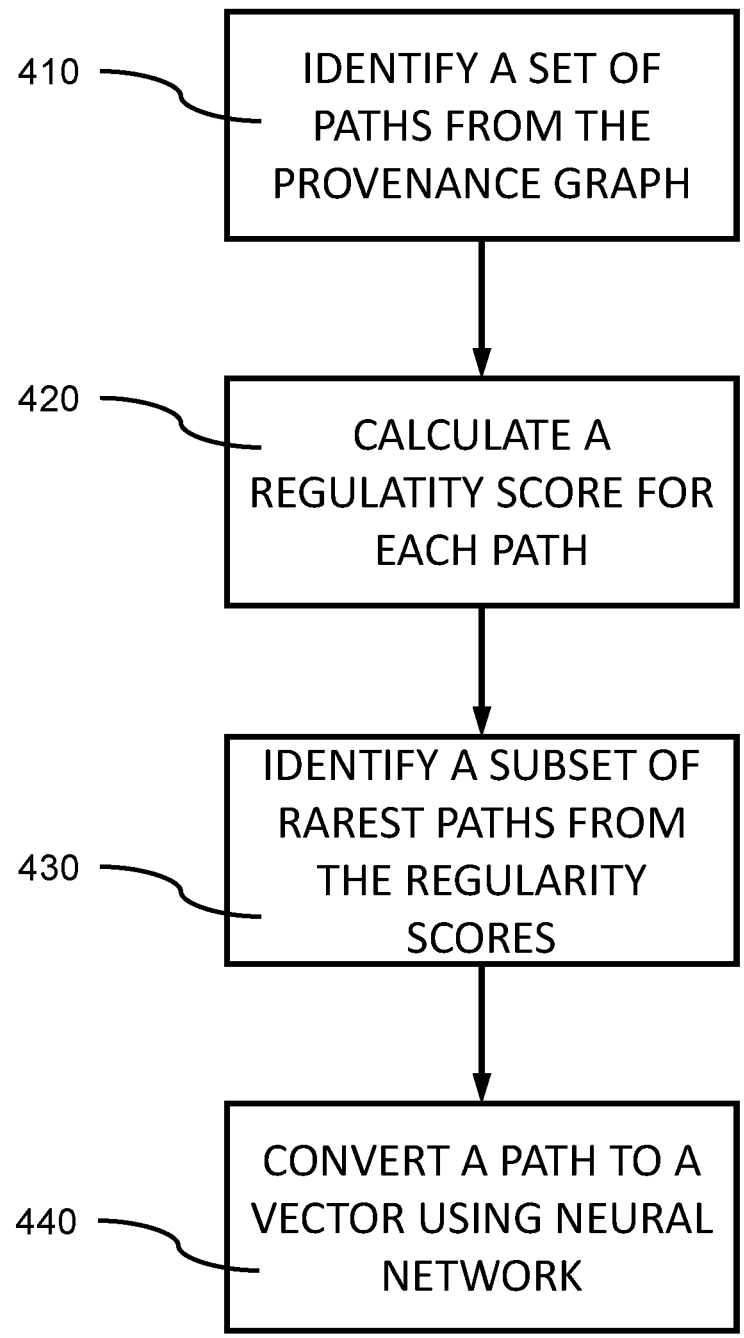
FIG. 4 is a block/flow diagram illustrating a system/method of an algorithm for sampling a path by extracting graphed paths from the built provenance graph, in accordance with an embodiment of the present invention.

FIG. 4 is a block/flow diagram illustrating a system/method of an algorithm for sampling a path by extracting graphed paths from the built provenance graph, in accordance with an embodiment of the present invention.

In various embodiments, the provenance-based threat detection tool can use a rareness-based path selection algorithm to identify causal paths in the provenance graph which represent the potentially malicious behavior of a process. These causal paths are then used by a pipeline of a document embedding model and an outlier detection model to determine if the process is malicious.

In block 410, a set of paths is selected from the provenance graph. These sample paths can be linear paths generated from branching paths of the provenance graph.

In block 420, a regularity score is calculated for each of the selected or sample paths.

In block 430, the regularity scores calculated for each of sample paths are compared, and a user defined number of the rarest paths are identified as causal paths.

In block 440, the causal paths can be embedded or converted to a vector using a neural network, for example, word2vec.

Figure 5:
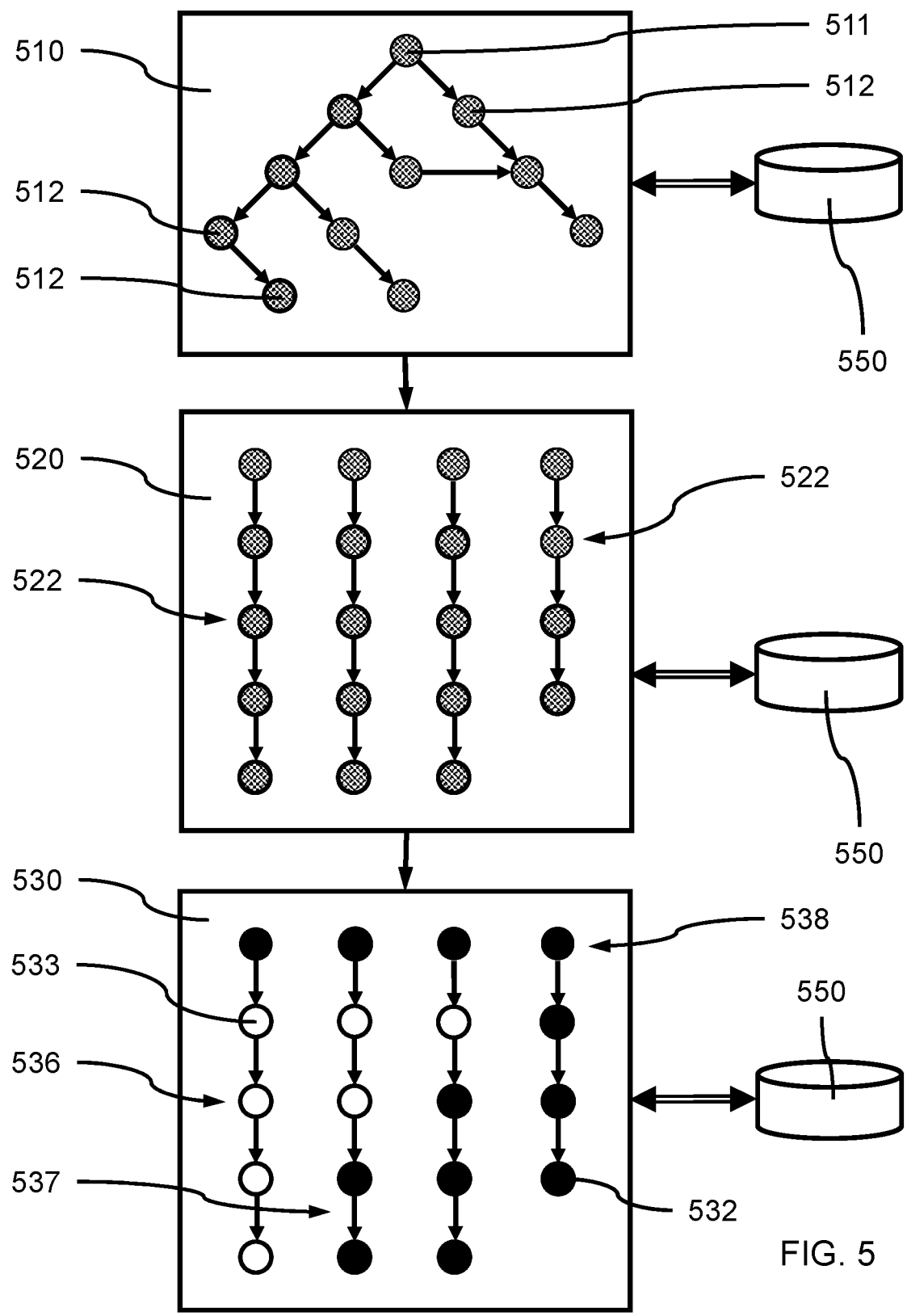
FIG. 5 is a block/flow diagram illustrating a system/method of an algorithm for the work flow of a provenance-based threat detection tool, in accordance with an embodiment of the present invention.

FIG. 5 is a block/flow diagram illustrating a system/method of an algorithm for the work flow of a provenance-based threat detection tool, in accordance with an embodiment of the present invention.

A provenance-based threat detection tool can be trained to recognize malicious activities from benign activities, so provenance data can be analyzed and malicious events identified in real time to determine if a process has been hijacked. This can be accomplished by recognizing the rareness of the specific activity compared to the benign activities.

In block 510, the provenance graph, G(p), is built from the recorded provenance data, where hatched circles 511, 512 of the graph are nodes representing entities, and edges are events connecting the entities of the observed process. The provenance graph, G(p), includes a plurality of actions by the process represented by the nodes 511, 512 and edges of the provenance graph. Block 510 illustrates a select portion of a provenance graph, G(p), for a process that was initiated at node 511 and proceeds through nodes 512. Multiple other processes (not shown) can also be executing on a system (e.g., computer, network, server, etc.), some of which may have begun before the illustrated process, and make up the larger provenance graph, G(P), for all such processes. Each of the nodes 511, 512 can have a time stamp that can be used to identify the sequence of actions taken by the process. The illustrated portion of the provenance graph, G(p), can be selected from a "snapshot" of the provenance graph at a given time, since the provenance graph can have multiple processes beginning and ending over time, where the provenance data for actions of a process at a single point in time extend backwards and forwards. The time stamp of each action can identify where in time the action took place, so the events on a causal graph are temporally ordered.

At the time of building the provenance graph, G(p), it is not necessarily known which actions are undertaken as part of a malware attack or which nodes and edges represent malicious actions rather than benign actions, so all nodes are shown having the same hatching.

A process instance of a program may contain two types of workloads: the universal workload and the instance-specific workload. The universal workloads are common across all instances of the same program and are thus less likely to be malicious. The instance-specific workloads are different from instance to instance based on the inputs. Malicious workloads are more likely to be instance-specific. Whether a path is generated from universal workloads or instance-specific workloads can be determined by its rareness. The more rare a path is, the more likely it is from an instance-specific workload.

In block 520, a subset of paths is selected from the current "snapshot" of the provenance graph generated for all the current processes based on the calculated regularity score.

Sample paths 522 reflect a single directed path for the possible paths from an initial node to each subsequent node without branching. Each sample path is represented as a single straight path including the nodes and edges from the provenance graph, G(p). The straight paths are selected from the "snapshot" of the provenance graph, where the actions at a single point in time extend backwards and forwards. The length of the sample paths 522 is determined by the value of N used to select the number of forward and backward steps from an initial node. The sample paths 522 are linear in time based on the time stamp for each node.

In various embodiments, a regularity score, R, can be calculated for each of the sample paths to determine the frequency or rareness of each sample path selected from the snapshot of the provenance graph. Rare paths are more likely to be malicious. A regularity score, R, can be used to define the rareness or frequency of a path. For a path, $\lambda=\{e_1, e_2, e_3, \ldots e_n\}$ where $e=\{src \rightarrow dst\}$, where src is source, and dst is destination. The regularity score is: $R(\lambda)=\Pi_{i=1 \rightarrow n}R(e_i)$. $R(e)=OUT(src) \cdot |H(e)|/|H| \cdot IN(dist)$. H(e) is the set of hosts that event e happens on while H is the set of all the hosts in the enterprise. To calculate IN and OUT for a node v, the training data is partitioned into n time windows $T=\{t1, t2, \ldots, tn\}$. We say $t_i$ is in-stable if no new in edges are added to v during $t_i$. Similarly, $t_i$ is out-stable if no new out edges are added to v during $t_i$. Then the IN(v) and OUT(v) are calculated using $IN(v)=|T'\text{ to}|/|T|$, and $OUT(v)=|T'\text{ from}|/|T|$. $|T'\text{ from}|$ is the count of stable windows in which no edge connects from v, and $|T'\text{ to}|$ is the count of stable windows in which no edge connects to v, and $|T|$ is the total number of windows.

In block 530, the rarer, less frequent paths can be identified based on the value of the regularity score calculated for each sample path. The less frequent and less stable an event is, the lower a regularity score it has. A sample path 522 that has less frequent entities and events would generate a lower regularity score. In various embodiments, finding paths with the lowest regularity scores can identify a malicious action. The provenance-based threat detection tool can use these causal paths as features to distinguish the malicious part of the provenance data from the benign part. The abnormality of a malicious operation may arise only when all dots are connected and considered as a whole. The provenance-based threat detection tool can model the whole causality path altogether as a vector and detects anomalous paths instead of anomalous steps.

In various embodiments, a regularity score can be used to rank each path based on their frequency. This is achieved by a causal path selection algorithm that selects the top K most uncommon (i.e, rarest) sample paths from a provenance graph. The part of a provenance graph that is shared by most instances of a program is not likely to be malicious. Thus, the part that is uncommon in other instances is focused on. The provenance-based threat detection tool can select a subset of causal paths 536, 537 from the sample graphs 522 from the provenance graph to address the dependency explosion problem. Leveraging this path selection algorithm, a provenance-based threat detection tool can reduce most of the training and detection workload and accelerate the speed of both training and detection. By filtering out common paths, analysis of rare paths can be conducted sooner and quicker, so malware can be stopped before the system is compromised.

In various embodiments, sample paths 522 that are generated by the instance-specific workloads (less common) can be selected over sample paths 522 generated by universal workloads (more common), as determined by the process instance's regularity score.

As illustrated in block 530, regularity scores are calculated for the nodes and edges in each of the sample paths 522, where solid black circles 532 of the graph are recognized frequent actions by the observed process, and the white circles 533 are recognized as rare actions by the observed process. The regularity score for causal paths 536, 537 having multiple rare actions (i.e., entities, events) or highly rare actions would be notably different (e.g., higher or lower) than causal paths 538 made up entirely of routine actions. The causal paths 536, 537 having identifiably different (e.g., lower) regularity scores can be selected for subsequent embedding and malware detection, while the causal path 538 an be eliminated from anomaly detection.

In various embodiments, the causal path selection problem is finding the top K paths with the lowest regularity scores from a current provenance graph. To address this, path selection can be converted into a longest path problem. A pseudo-source node can be added to the first node of the graph and a pseudo-sink node can be added to the last nodes in each sample path of provenance graph, G(p) whose out-degree are zero. This converts provenance graph, G(p), to a single source and single sink flow graph G*(p). A distance is assigned to each edge e as W(e)=−log 2 R(e), where the outgoing edges of $v_{source}$ (the pseudo-source node) and incoming edges of $v_{sink}$ (the pseudo-sink node) are all uniformly initialized to 1. the length of λ could be converted as $L(\lambda)=\Sigma_{i=1-n} W(e_i)=-\log_2 \Pi_{i=1-n} R(e_i)$. The K longest paths in G*(p) are the K paths with lowest regularity scores in G.

In various embodiments, the K longest path problem on a general graph can be efficiently solved by reducing it to the K longest paths problem on a Directed Acyclic Graph (DAG), which can be efficiently solved by the Epstein's algorithm with a time complexity linear to the number of nodes.

To reduce this problem to the K longest paths problem on a DAG, G* can be converted to a DAG. For each node N in G*, the provenance-based threat detection tool can order all its in-edges and out-edges in the temporal order. Then N is split into a set of nodes $\{n_1, n_2, n_3, \ldots, n_t\}$. Any $n_i$ has the same attributes as N but guarantees that all its in-edges are temporally earlier than any of its out-edges. As the provenance-based threat detection tool requires all events on a causal graph are temporally ordered, splitting a node based on the temporal orders of its in-edges and out-edges removes all loops in the graph. After the conversion, the provenance-based threat detection tool relies on existing algorithm to find the K longest paths on the DAG.

In various embodiments, the causal paths 536, 537 identified as having the K lowest regularity scores from block 530 can be converted into numerical vectors through path embedding by viewing the causal path as a sentence/document: the nodes and edges in the path are words that compose the "sentence" which describes a program behavior.

To learn an embedding vector for a causal path, we can leverage the document embeddings model with the path as a sentence. Formally, a causal path λ can be translated to a sequence of words $\{l(e_i, src), l(e_i), l(e_i, dst), \ldots l(e_n, src), l(e_n), l(e_n, dst)\}$, where l is a function to get the text representation of a node or an edge. The causal paths can be viewed as a sentence with each node of the path or graph considered a noun, and each edge of the path or graph considered a verb. Currently, a process node can be represented by its executable path, a file node by its file path, and a socket node by its source or destination IP and port; we represent an edge by its relation.

In various embodiments, the PV-DM model of doc2vec can be used to learn the embedding of paths. This is a self-supervised method, where the encoder can be trained with benign data. This projects the paths to the numerical vector space so that similar paths are closer, while different paths are far away. This allows application of other distance-based outlier detection methods. This also considers the order of words, which can be important because while, for example, a cmd.exe starting a winword.exe is likely benign, a winword.exe starting a cmd.exe is often malicious. The PV-DM model can be trained using a Gensim library, which can embed each path into a 100 dimensional embedding vector. The embedding vector(s) can be used to train a outlier detection model using the Local Outlier Factor (LOF) algorithm.

In each step the data can be saved to a database 550.

Figure 6:
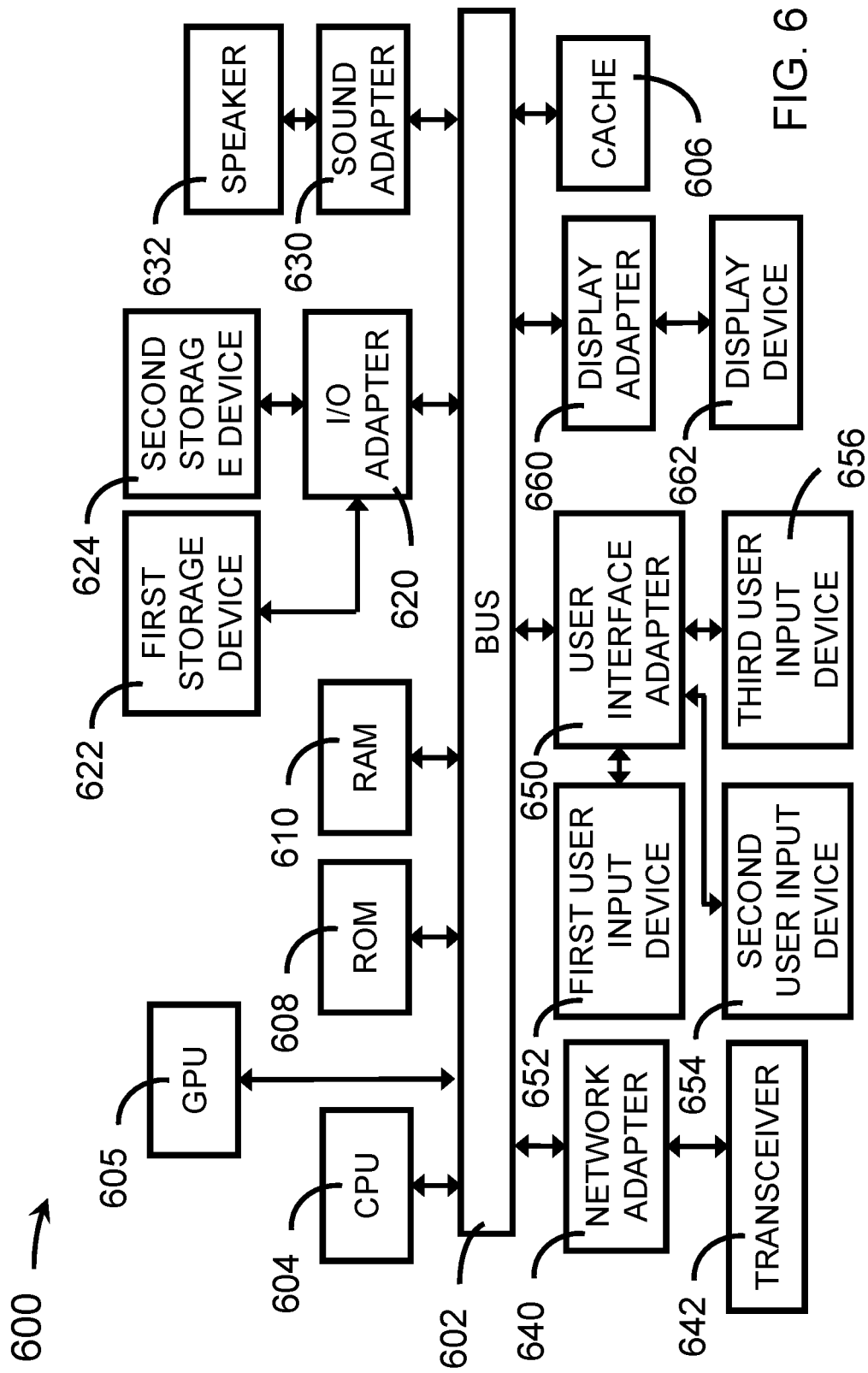
FIG. 6 is an exemplary processing system 600 to which the present methods and systems may be applied, in accordance with an embodiment of the present invention.

FIG. 6 is an exemplary processing system 600 to which the present methods and systems may be applied, in accordance with an embodiment of the present invention.

The processing system 600 can include at least one processor (CPU) 604 and at least one graphics processing (GPU) 605 that can perform vector calculations/manipulations operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, can be operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 354, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 can be used to input and output information to and from system 600.

In various embodiments, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Moreover, it is to be appreciated that system 600 is a system for implementing respective embodiments of the present methods/systems. Part or all of processing system 600 may be implemented in one or more of the elements of FIGS. 1-5 and 7-10. Further, it is to be appreciated that processing system 600 may perform at least part of the methods described herein including, for example, at least part of the method of FIGS. 2-5.

Figure 7:
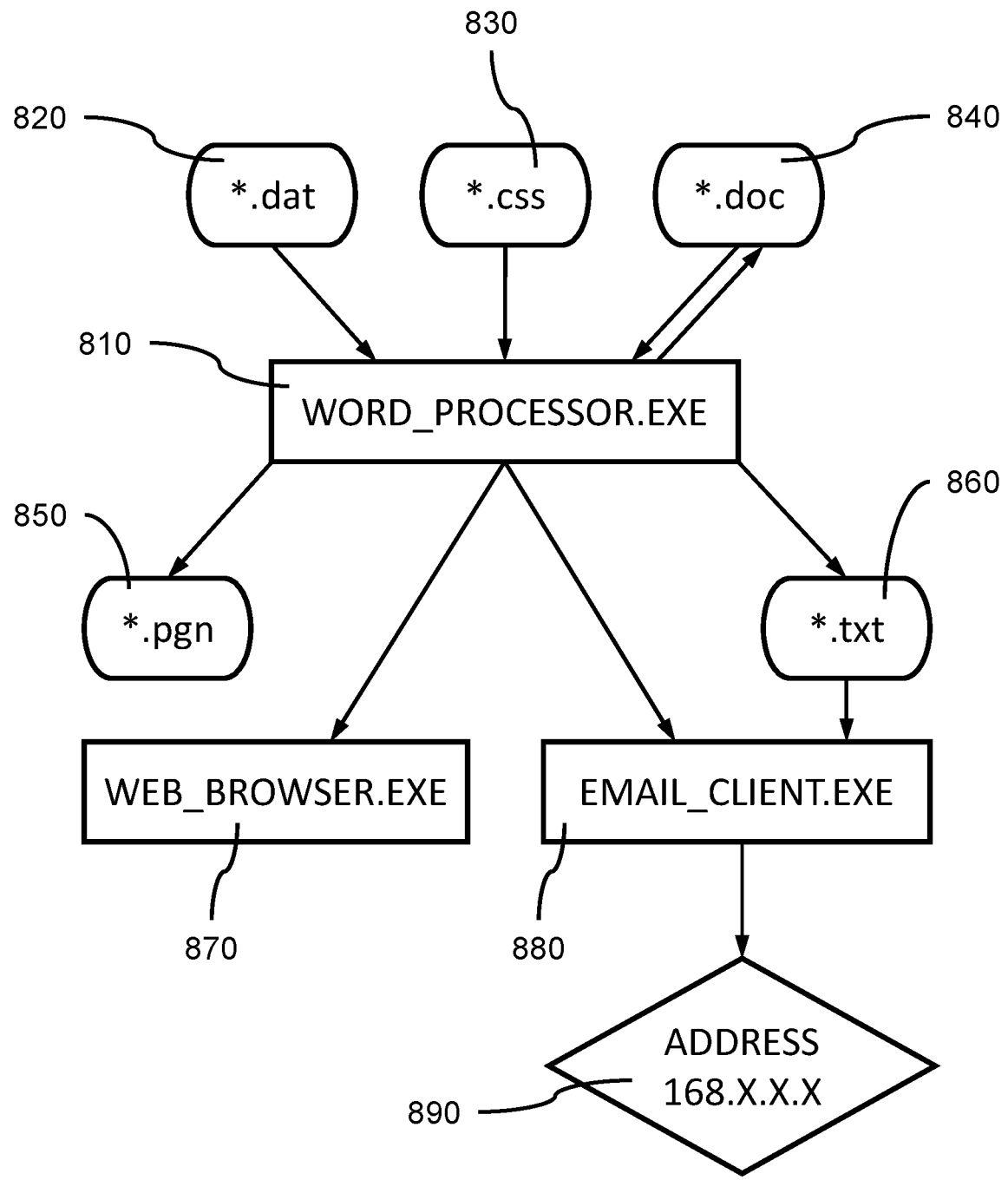
FIG. 7 is a block/flow diagram illustrating a non-limiting example of a process flow for a benign process, in accordance with an embodiment of the present invention.

FIG. 7 is a block/flow diagram illustrating a non-limiting example of a process flow for a benign process, in accordance with an embodiment of the present invention.

In various embodiments, the provenance graph of a benign instance of a word processing program 810, WORD_PROCESSOR.EXE, can be illustrated. A benign process of word processing program 810 can read multiple types of files, for example, .dat 820, .css 830, .doc 840, etc.) created by other programs or itself, and writes new files, for example, .doc 840, png 850, .txt 860, etc.). The created files can also be read by other programs such as web browsers 870, WEB_BROWSER.EXE, and email clients 880, EMAIL_CLIENT.EXE, where a .txt file 860 may be sent as an attachment to another address 890. It can also start other programs such as web browsers 870, WEB_BROWSER.EXE, for example, when a user clicks a URL actively functioning as a link in a .doc file. Each of these events and entities can have a time stamp showing the order of execution. The order of execution of the process instance can generate provenance data and a provenance graph G(p).

Figure 8:
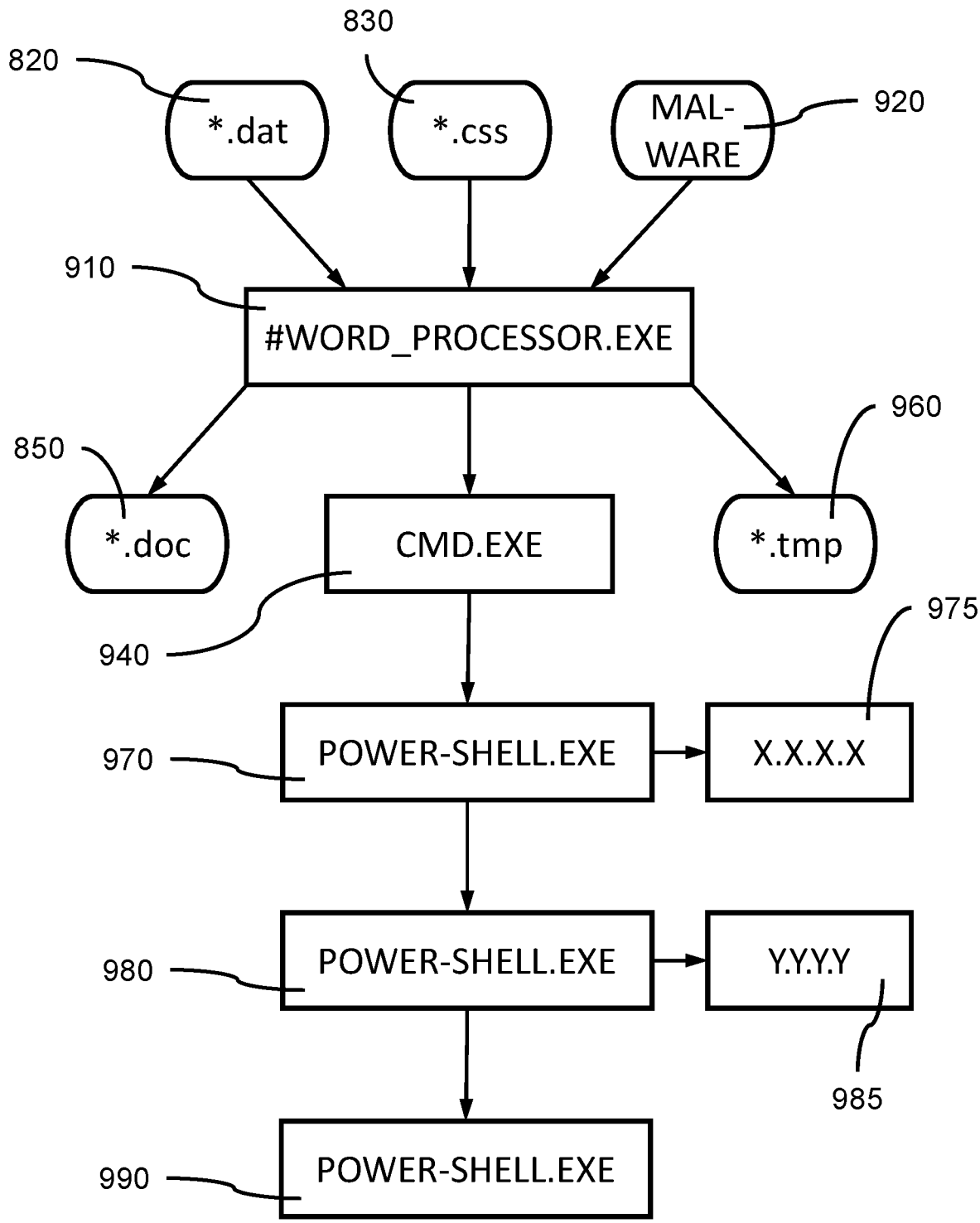
FIG. 8 is a block/flow diagram illustrating a non-limiting example of a process flow for a malicious process, in accordance with an embodiment of the present invention.

FIG. 8 is a block/flow diagram illustrating a non-limiting example of a process flow for a malicious process, in accordance with an embodiment of the present invention.

In various embodiments, the provenance graph of a malicious instance of a word processing program 810, WORD_PROCESSOR.EXE, which is used in the DDE script-based attack, can be illustrated.

Similar to the benign instance, this malicious word processor instance also reads and writes different types of files, including .dat 820, .css 830, .doc 840, etc. However, a compromised word processing program 910, #WORD_PROCESSOR.EXE, can open malware 920 and start a cmd.exe process 940, which further spawns several powershell.exe processes 970, 980, 990, that can cause additional malicious events, including accessing internal or external IP addresses 975, 985 to download additional malware or export files containing sensitive or valuable data, etc. This behavior is very different from that of the benign one illustrated in FIG. 7, and the entities and events making up the process flow is less frequent than the benign process.

Once these process behaviors are represented as provenance graphs, these attack paths become very distinguishable from benign ones. Therefore, provenance tracking and analysis is a key technique to detect stealthy attacks. On the other hand, as shown in FIG. 7, since stealthy attacks take advantage of processes already running in the system, their malicious behaviors could be hidden in benign behaviors of these processes. Moreover, to make the attacks stealthy, malware could mimic and blend in existing benign behaviors. Thus, it is a main challenge to accurately capture the robust and stable features from provenance graphs that can effectively differentiate malicious behaviors from benign ones. A provenance-based threat detection tool and method can identify such fileless attacks in real-time and stops them from spreading or completing an attack that might obtain sensitive material or other compromise the computer system.

Figure 9:
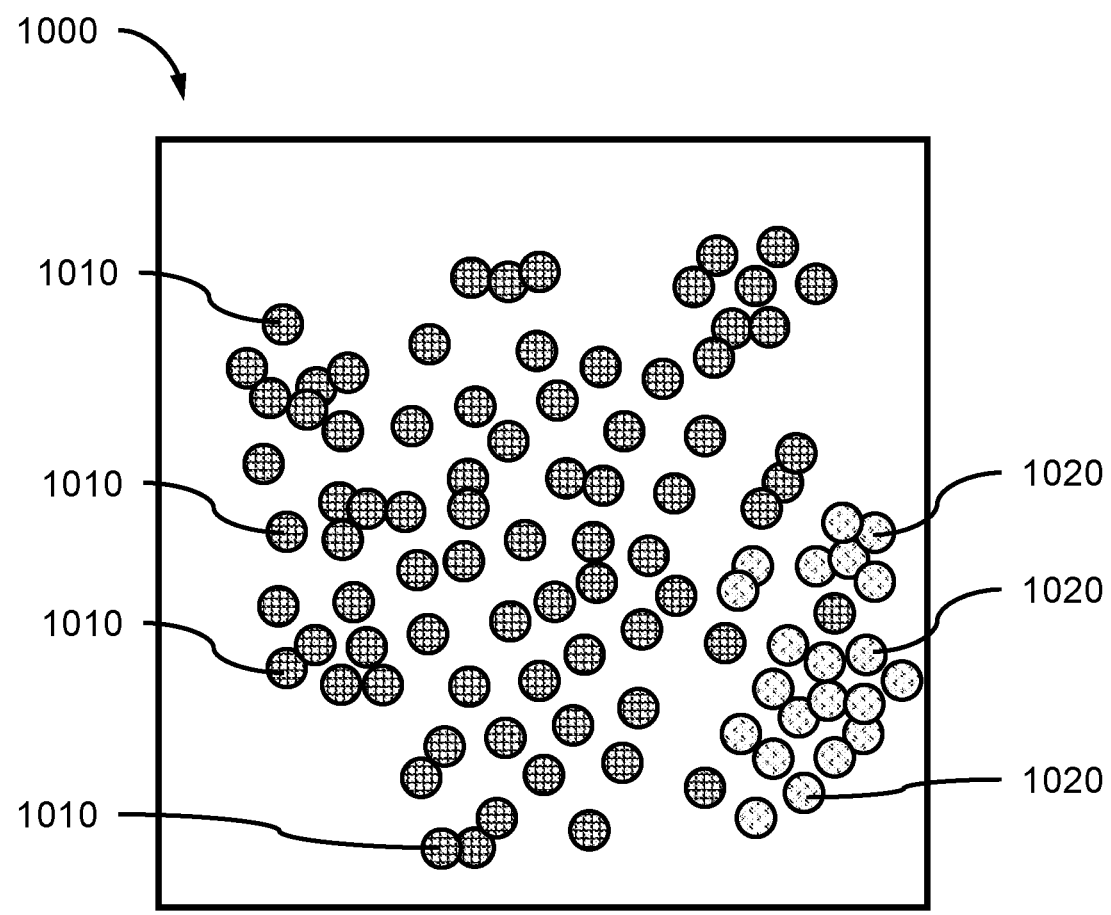
FIG. 9 is a graph illustrating the clustering of malicious paths compared to benign paths, in accordance with an embodiment of the present invention.

FIG. 9 is a graph illustrating the clustering of malicious paths compared to benign paths, in accordance with an embodiment of the present invention.

In various embodiments utilizing either the OC-SVM or LOF anomaly detection models, malicious behavior encompassed within the embedded paths can be identified by the clustering of the results of the anomaly detection in a graph 1000. The grid hatched circles 1010 represent the more frequent benign processes and associated embedded paths, whereas the carrot hatched circles 1020 represent the less frequent malicious processes and associated embedded paths. The carrot hatched circles 1020 representing the malicious processes are clustered together in a portion of the graph 1000.

In various embodiments, the selected benign paths form multiple clusters representing the diversity of custom workloads of benign programs. The selected (rare) paths from malicious graphs are very different from other benign paths, therefore they are easy to be separated in the embedding space. The malicious processes can, therefore, be identified from the benign processes with a high degree of confidence by the anomaly detection models.

Figure 10:
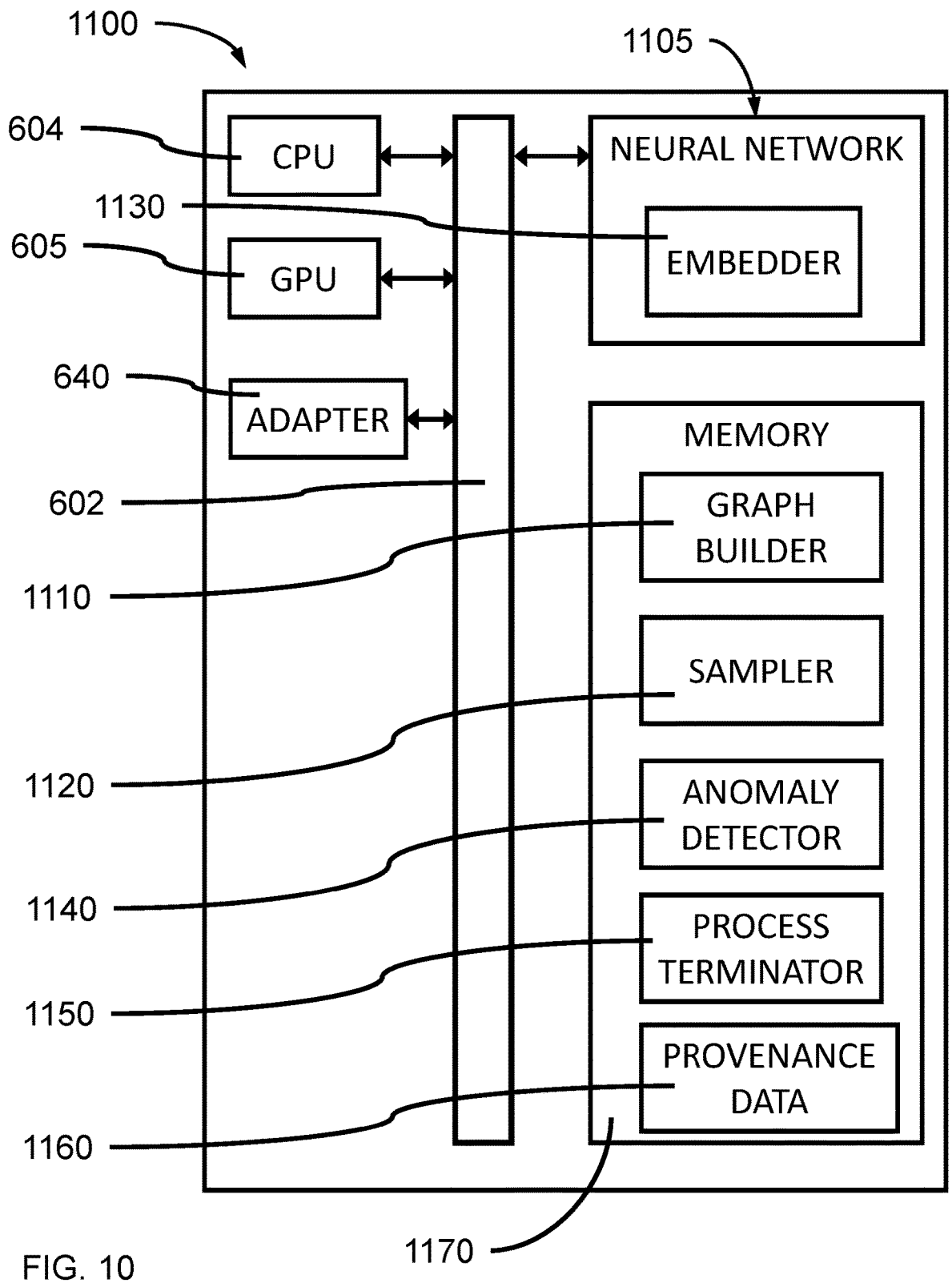
FIG. 10 is an exemplary processing system configured to implement a provenance-based threat detection tool, in accordance with an embodiment of the present invention.

FIG. 10 is an exemplary processing system configured to implement a provenance-based threat detection tool, in accordance with an embodiment of the present invention.

In one or more embodiments, the processing system 1100 can be a computer system 600 implementing a neural network 1105 to perform a computer implemented method of detecting malicious behavior of computer processes.

In one or more embodiments, the processing system 1100 can be a computer system 600 having memory components 1170, including, but not limited to, the computer system's random access memory (RAM) 610, hard drives 622, and/or cloud storage to store and implement a computer implemented method of detecting malicious behavior of computer processes. The memory components can also utilize a database 550 for organizing the memory storage.

In various embodiments, the memory components 1170 can include a graph builder 1110 that can be configured to build a provenance graph, G, from provenance data 1160 obtained from a computer system and/or network. The graph builder 1110 can also be configured to collect provenance data using hook functions.

In various embodiments, the memory components 1170 can include a sampler 1120 configured to sample the provenance graph to form a plurality of linear sample graphs. The sampler 1120 can also be configured to calculate regularity values for each of the linear sample graphs, and select a subset of linear sample graphs as causal graphs based on the regularity values calculated.

In various embodiments, the neural network 1105 can include an embedder 1130 configured to convert the selected subset of causal paths into vectors, where the conversion can utilize graph2vec or doc2vec. Each of the plurality of paths can thereby be embedded using graph2vec or doc2vec.

In various embodiments, the memory components 1170 can include an anomaly detector 1140 configured to determine which embedded paths exhibit malicious behavior, where the anomaly detector can be configured to use an anomaly detection model of one-class support vector machine (OC-SVM) or Local Outlier Factor (LOF). The anomaly detector 1140 may also configured to identify malware or malicious behavior through analysis of clusters generated by the anomaly detector.

In various embodiments, the memory components 1170 can include a process terminator 1150 configured to send one or more commands to terminate a process identified as malicious and/or stealth malware. The process terminator 1150 may also be configured to send an alert signal or communication to a system administrator identifying the malicious behavior and/or stealth malware.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented provenance-based threat detection method, comprising:
   building a provenance graph including a plurality of paths using a processor device from provenance data obtained from one or more computer systems and/or networks, wherein the provenance graph is built by collecting the provenance data using hook functions that intercept operating system calls;
   sampling the provenance graph to form a plurality of linear sample paths;
   calculating a regularity score for each of the plurality of linear sample paths using a processor device;
   selecting a subset of linear sample paths from the plurality of linear sample paths based on the regularity score;
   embedding each of the subset of linear sample paths by converting each of the subset of linear sample paths into a numerical vector using a processor device;
   detecting anomalies in the embedded paths to identify malicious process activities, wherein the anomalies in the embedded paths are detected using an anomaly detection model that is configured to identify malicious activity, wherein the anomaly detection model is selected from the group consisting of one-class support vector machine (OC-SVM) and Local Outlier Factor (LOF); and
   terminating a process related to the embedded path having the identified malicious process activities.

2. The method as recited in claim 1, wherein selecting a subset of linear sample paths addresses a dependency explosion problem.

3. The method as recited in claim 1, wherein the anomaly detection model is trained using a benign training data set.

4. The method as recited in claim 3, wherein embedding each of the plurality of paths is done using graph2vec or doc2vec.

5. A non-transitory computer readable storage medium comprising a computer readable program for a computer implemented provenance-based threat detection tool, wherein the computer readable program when executed on a computer causes the computer to perform the steps of:
   building a provenance graph including a plurality of paths using a processor device from provenance data obtained from one or more computer systems and/or networks, wherein the provenance graph is built by collecting the provenance data using hook functions that intercept operating system calls;
   sampling the provenance graph to form a plurality of linear sample paths;
   calculating a regularity score for each of the plurality of linear sample paths using a processor device;
   selecting a subset of linear sample paths from the plurality of linear sample paths based on the regularity score;
   embedding each of the subset of linear sample paths by converting each of the subset of linear sample paths into a numerical vector using a processor device;
   detecting anomalies in the embedded paths to identify malicious process activities, wherein the anomalies in the embedded paths are detected using an anomaly detection model that is configured to identify malicious activity, wherein the anomaly detection model is selected from the group consisting of one-class support vector machine (OC-SVM) and Local Outlier Factor (LOF); and
   terminating a process related to the embedded path having the identified malicious process activities.

6. The method as recited in claim 5, wherein selecting a subset of linear sample paths addresses a dependency explosion problem.

7. The computer readable program as recited in claim 5, wherein the anomaly detection model is trained using a benign training data set.

8. The computer readable program as recited in claim 7, wherein embedding each of the plurality of paths is done using graph2vec or doc2vec.

9. A system for provenance-based threat detection, comprising:
   a computer system including:
   random access memory configured to store a provenance-based threat detection tool;
   one or more processor devices and an operating system having a kernel, wherein one or more hook functions operating in the kernel are configured to collect provenance data using the hook functions that intercept operating system calls; and
   a database configured to store the provenance data collected by the one or more hook functions, wherein the provenance-based threat detection tool is configured to:
   build a provenance graph including a plurality of paths using the one or more processor devices from provenance data obtained from the computer systems and/or a network;
   sample the provenance graph to form a plurality of linear sample paths;
   calculate a regularity score for each of the plurality of linear sample paths using the one or more processor devices;
   select a subset of linear sample paths from the plurality of linear sample paths based on the regularity score;
   embed each of the subset of linear sample paths by converting each of the subset of linear sample paths into a numerical vector using the one or more processor devices;
   detect anomalies in the embedded paths to identify malicious process activities, wherein the anomalies in the embedded paths are detected using an anomaly detection model that is configured to identify malicious activity, wherein the anomaly detection model is selected from the group consisting of one-class support vector machine (OC-SVM) and Local Outlier Factor (LOF); and
   terminate a process related to the embedded path having the identified malicious process activities.

10. The system as recited in claim 9, wherein selecting a subset of linear sample paths addresses a dependency explosion problem.

11. The system as recited in claim 9, wherein the anomaly detection model is trained using a benign training data set.

* * * * *